June 8, 1948. H. C. KRONE ET AL 2,442,953
DETACHABLE VALVE MEANS FOR TANK EMERGENCY VALVES
Filed Jan. 4, 1946 2 Sheets-Sheet 1
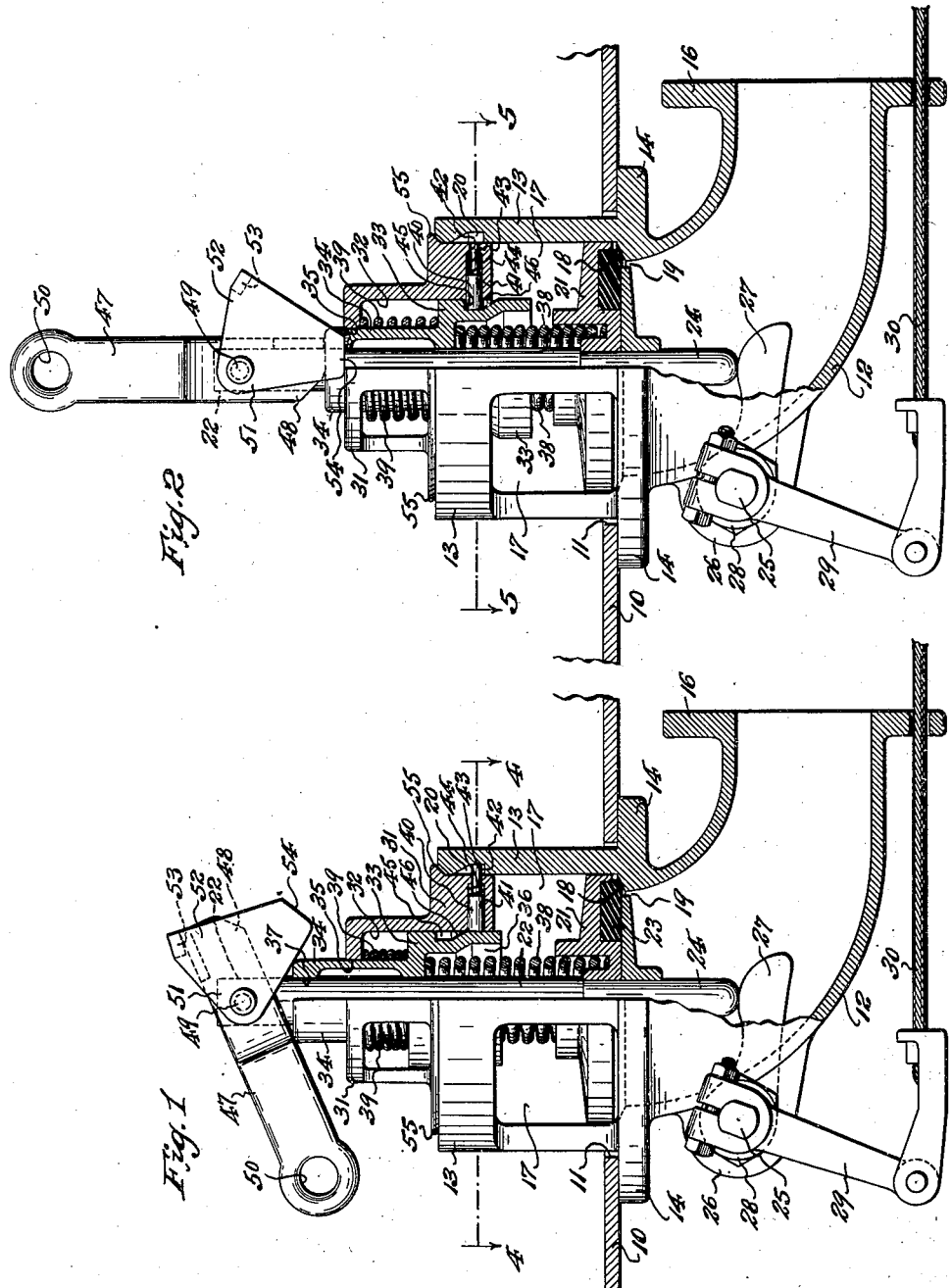
INVENTORS:
Howard C. Krone & William Meyer,
BY George D. Richards
Attorney June 8, 1948.  H. C. KRONE ET AL  2,442,953
DETACHABLE VALVE MEANS FOR TANK EMERGENCY VALVES
Filed Jan. 4, 1946  2 Sheets-Sheet 2
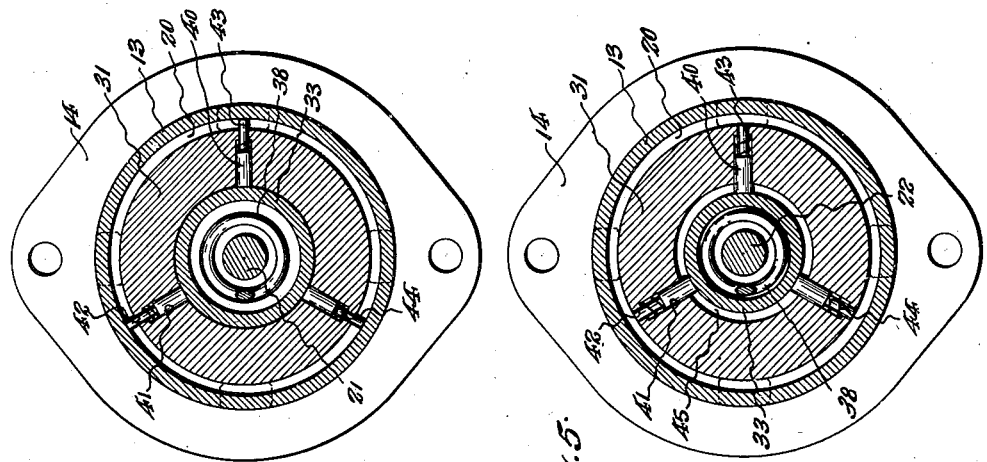
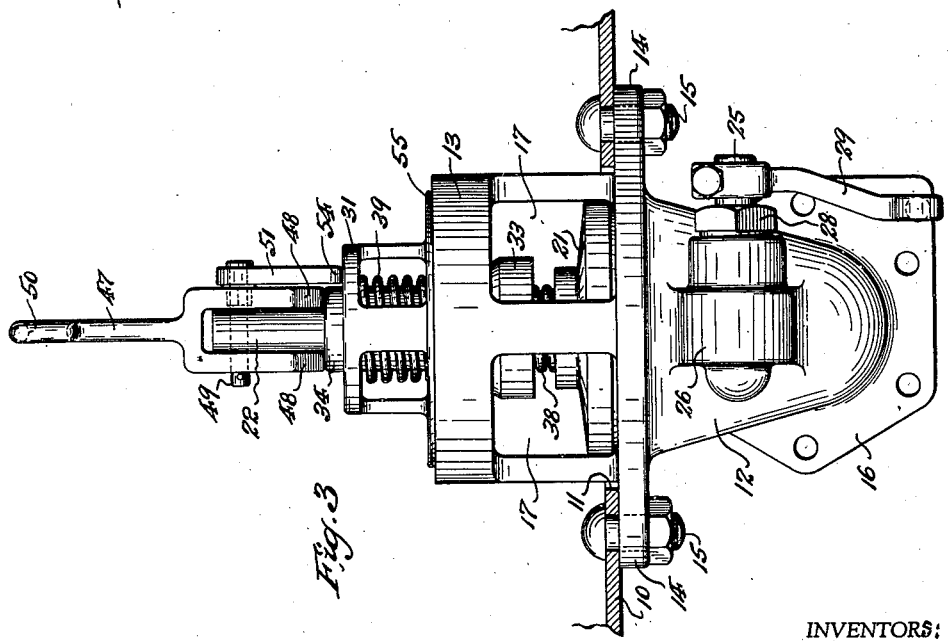
INVENTORS:
Howard C. Krone & William Meyer,
BY George D. Richards
Attorney Patented June 8, 1948

2,442,953

UNITED STATES PATENT OFFICE 2,442,953

DETACHABLE VALVE MEANS FOR TANK EMERGENCY VALVES

Howard C. Krone, River Edge, and William Meyer, East Orange, N. J., assignors to Wheaton Brass Works, Newark, N. J., a corporation of New Jersey Application January 4, 1946, Serial No. 638,946

7 Claims. (Cl. 137—21)

This invention relates to improvements in discharge valves for tanks; and the invention has reference, more particularly, to discharge valves of the emergency type, such as are especially adapted for use in connection with the tank compartment or compartments of tank trucks, tank cars, and the like employed in the transportation of petroleum products.

Emergency valves of the kind to which the present invention relates, find one of their most advantageous fields of use in connection with the tank compartment or compartments of tank trucks, tank cars or the like, wherein an emergency valve is located at the bottom of a tank compartment at the point of discharge thereof into a delivery conduit leading therefrom to a faucet valve through which controlled delivery of the tank compartment content is attained. An emergency valve includes a normally closed spring pressed valve member; operating means being provided to open said valve member against the pressure of its closing spring. Ordinarily said emergency valve includes an external outlet portion or elbow to couple with a discharge conduit, said portion or elbow being affixed to extend exteriorly from the tank compartment bottom, and so that the valve member cage connected therewith is disposed and supported within the bottom interior portion of the tank compartment.

It frequently happens that, due to wear or other causes, the valve member requires repair, such for example as replacement of its closing spring or of its valve washer. In such case, either the entire emergency valve must be uncoupled from a delivery conduit and bodily dismounted and withdrawn from normal connected relation to the tank compartment, or the workman must gain access to the interior of the tank compartment through a manhole at the top thereof, so as to reach and repair the valve mechanism from within the tank compartment; both of said methods are laborious and time consuming, and in many cases it is not possible to employ the second mentioned method.

It is an object of this invention to provide a novel emergency valve structure which will simplify the operation of gaining access thereto for repair or replacements, and which will avoid the necessity of uncoupling the same from a conduit served thereby and thereupon bodily removing the same from the tank. To this end the novel emergency valve includes a detachable valve member supporting structure having releasable means for removably coupling the same to and within the valve cage and in operative relation to the external outlet portion of the valve, together with manipulatable means for actuating the coupling means, whereby to engage and disengage the valve member supporting structure with and from the valve member cage and said external outlet portion.

This invention has for another object to provide, in an emergency valve structure as above characterized, a novel coupling lock means so constructed and arranged as to be controlled by a novel cam lever means, the latter being adapted to be operatively engaged by a suitable tool which can be inserted into the tank interior through an opened top manhole thereof, so as to engage and work said cam lever. Said cam lever is so engageable by the actuating tool as to couple the valve member supporting structure with the tool, whereby to permit withdrawal of the structure, when released, upwardly through the tank compartment interior and outwardly through the manhole of the latter, thus delivering the valve member and its supporting structure externally of the tank compartment subject to repair. After a repair has been made, the valve member supporting structure may, in similar manner, be engaged by the actuating tool and held thereby for return into the tank compartment interior, subject to manipulation for recoupling and relocking the same with the valve member cage and the external outlet portion of the valve.

The invention has for a further object to provide a novel releasable detent means for positively holding the coupling lock means in released position against premature locking movement preparatory to and while returning the valve member supporting structure through the tank compartment interior and into operative assembled relation to the valve member cage and the external outlet portion of the valve.

An illustrative embodiment of the novel emergency valve structure made according to this invention is shown in the accompanying drawings, in which:

Fig. 1 is in part a side elevational view and in part a vertical longitudinal sectional view of the novel emergency valve according to this invention as connected with the bottom of a tank compartment, and with the detachable valve member supporting structure of the valve in operative assembled and locked relation to the valve member cage; Fig. 2 is a view similar to that of Fig. 1, but showing the valve member supporting structure released for detachment from the valve member cage; Fig. 3 is an elevational view of the emergency valve as viewed from the left in Fig.

2; Fig. 4 is a horizontal sectional view, taken on line 4—4 in Fig. 1; and Fig. 5 is a similar horizontal sectional view, taken on line 5—5 in Fig. 2.

Similar characters of reference are employed in the hereinabove described views, to indicate corresponding parts.

Referring to the drawings, the reference character 10 indicates the bottom of a tank compartment having an opening 11 over which the external outlet portion 12 of the emergency valve is disposed, with the valve member cage 13 extending upwardly therethrough and into the interior of the tank compartment. Said external outlet portion 12 is illustratively shown as of the flanged elbow type, having a flange 14 which is bolted to the tank compartment bottom by bolts 15, and having a similar flange 16 at its outlet end to which a correspondingly flanged discharge conduit (not shown) may be bolted. Any other known means may be employed for affixing the emergency valve to the tank compartment bottom, and similarly any other known means may be used for joining a discharge conduit to the outlet end of the valve.

The valve member cage 13 is open at its upper end, and is also provided with liquid intake openings 17 in its side walls. Suitably formed at the juncture of said valve member cage 13 with the outlet portion 12 of the valve is an internal annular valve seat 18 which surrounds and defines the discharge port 19 of the valve. Adjacent to its upper open end, said valve member cage 13 is provided with an internal annular lock bolt receiving channel 20.

Guided by and axially movable within the valve member cage 13 above the valve seat 18 is a valve member 21, to which is affixed an upwardly extending stem 22. Carried by said valve member 21 is a valve washer 23 of suitable material or composition, which is adapted to engage and seal against said valve seat 18 when the valve member is positioned to close the discharge port 19. Suitably connected with said valve member and its stem, to depend axially from the under side of the valve member into the interior of said outlet portion of the valve, is a valve member lift stud 24.

Mounted in connection with the outlet portion 12 of the valve is actuating means for lifting the valve member 21 to open the discharge port 19, said means being operable from a point remote from the valve, as e. g. from the rear end of a tank truck in which the tank compartment served by the valve is a part, all in a manner known to the art. Said valve actuating means comprises a rotative spindle 25 which is suitably journaled in and between the side walls of a housing portion 26 with which said valve outlet portion 12 is provided. Affixed to an inner part of said spindle 25 is a lift cam 27 which is adapted to be upswung by rotative movement of said spindle 25, thereby to engage and thrust upwardly upon said lift stud 24 with resultant raising of the valve member 21 and consequent opening of the valve port 19. An end of said spindle 25 projects exteriorly from the housing portion 26 through a suitably sealed gland or stuffing box 28, and affixed to said exterior end of said spindle is a lever arm 29. Suitably coupled to said lever arm 29 is a pull cable 30 which leads to a remote point from which it is desired that that valve may be operated.

Adapted to be entered into the upper open end of said valve member cage 13 is a locking cap 31 having an internal cylinder chamber 32. Slidable in said cylinder chamber 32 is a lock bolt controlling plunger 33, the same having a hub extension 34 extending from its upper end and adapted to project exteriorly through an opening 35 which is provided in the top end wall of said locking cap cylinder chamber 32. Below said hub extension 34, the plunger 33 is preferably provided with a downwardly open chamber 36 through which the valve stem 22 extends, and said hub extension 34 is provided with an axial bore 37 through which the valve stem 22 likewise extends, whereby said plunger and stem are slidably related one to the other.

Arranged around the valve stem 22, and engaged between the plunger 33 and the valve member 21, is a heavy compression spring 38 which yieldably thrusts said valve member 21 downward into engagement with the valve seat 18, whereby to close the valve port 19, and which yieldably thrusts the plunger 33 to a normal initial raised position. Suitable means is provided for determining the normal initial raised position of the plunger 33 in the locking cap cylinder chamber 32. Preferably this means comprises a normally contracted compression spring 39 which is mounted around the hub extension 34 of the plunger 33 between the top end wall of the locking cap cylinder chamber 32 and the main body of said plunger 33. The tension of said spring 39 is substantially less than that of the main valve spring 38, whereby to be normally compressed by the plunger raising thrust of the latter.

Mounted in the locking cap 31 is at least one and preferably a plurality of radial locking bolt elements adapted to be projected by the controlling plunger 33 into the bolt receiving channel 20 of the valve member cage 13, when the locking cap 31 is entered in the latter and the plunger 33 is positioned in normal initial raised position within the locking cap cylinder chamber 32. Each said locking bolt element comprises a bolt body 40 which is slidably housed in an inwardly open, radially extending housing cavity 41 with which the body of the locking cap 31 is provided. Said housing cavity 41 is provided at its outer end with an opening 42 of reduced diameter through which a bolt nosing 43 of corresponding diameter, which extends axially from the bolt body 40, may be projected. Compression spring means 44 is arranged about the bolt nosing 43 between the inner end of the housing cavity 41 and the end of the bolt body 40 which is opposed thereto. Said spring 44 functions to retract the bolt element to a released position relative to the bolt receiving channel 20 of the valve member cage 13. The lock bolt controlling plunger 33 is provided with a suitably disposed external annular bolt body receiving channel 45, which is bounded at its lower side by a downwardly and outwardly inclined camming wall 46; said wall terminating at the exterior surface of the plunger 33.

Manipulatable means is provided in connection with the upper exteriorly projecting end portion of the valve stem 22 for cooperation with the hub extension 34 of the lock bolt controlling plunger 33, whereby to depress or lower the latter from normally raised lock bolt element projecting position to lock bolt element releasing position. This means comprises an actuating lever 47 having at one end a preferably bifurcated cam arm 48 which is fulcrumed on the valve stem end portion by a pivoting pin 49, so as to be movable into and out of engagement with the hub extension 34 of the plunger 33. At its opposite or outer end, said actuating lever 47 is provided with an eye member 50.

In the operation of unlocking and then detaching the locking cap 31 from the valve member cage 13, whereby to remove therewith and from said cage 13 the valve member assembly, a hook rod (not shown) of a length sufficient to reach downwardly through an open manhole (not shown) of a tank compartment to the valve is provided.

Assuming the locking cap 31 and valve assembly is entered in the valve member cage 13, with said locking cap locked to the latter by the projected bolt element means, as shown in Fig. 1, and that it is desired to release and remove said locking cap and valve assembly, the operator reaches down through the tank compartment with the aforesaid hook rod, and engages the hook of the latter through the eye member 50 of the actuating lever 47. This having been done, the operator merely pulls upwardly on said hook rod, and by so doing, first swings the actuating lever about its fulcrum pin 49, thereby swinging down the cam arm 48 against the end of the plunger hub extension 34 with down thrusting effect operative to move the plunger 33 downwardly within the locking cap cylinder chamber 32 (see Fig. 2). This enforced downward movement of the plunger 33 is exerted against the tension of the main valve spring 38, but is assisted by the tensional expanding action of the plunger spring 39. When the actuating lever 47 is swung to perpendicular operative position, the plunger 33 will have been lowered to the limit of downward movement, at which point the bolt body receiving channel 45 will be registered in alignment with the bolt bodies 40, whereby the retracting springs 44 will move the latter rearwardly and into said channel 45, thus withdrawing the bolt nosings 43 thereof out of the locking bolt receiving channel 20 of the valve member cage 13 (see Figs. 2 and 5). Such retraction of the bolt elements releases the locking cap 33 and valve member assembly from secured relation to the valve member cage 13, whereupon the operator may, by pulling upwardly upon the hook rod, withdraw the valve member assembly from said cage, and thence upwardly through the tank compartment interior, and outwardly through the manhole.

After such repairs of the valve member assembly as may be required have been made, and it is desired to return said assembly to and into normal locked engagement with said valve member cage 13, the actuating lever is upswung to plunger depressing and lock bolt element retracting position ready for such return. In order to securely hold the plunger 33 depressed and the actuating lever 48 upswung against premature or accidental displacement from such positions, pending return of the valve member assembly to the cage 13, releaseable means is provided which is manipulatable to positively hold these parts in such positions. Such means comprises a retainer or detent pawl member 51 which is pivotally supported by the fulcrum pin 49 adjacent to the cam arm 48 of the actuating lever 47. Said retainer or detent pawl member 51 is provided with a laterally offset portion 52 in connection with its pivoted end, and extending angularly from said offset portion and transversely of the cam arm 48 of the actuating lever 47, subject, at proper times, to engagement by the latter, is a trip lug or ear 53. Preparatory to return of the valve member assembly to the valve member cage 13, after the actuating lever 47 has been upswung to plunger depressing and lock bolt element retracting position, said retainer or detent pawl member 51 is swung down to engage its free end 54 with the upper end of the locking cap 31 (see Figs. 2 and 3) whereby to positively retain the plunger 33 in depressed and lock bolt element releasing position. When the assembly is thus conditioned, the operator again engages the hook end of a hook rod in the eye member 50 of the actuating lever 47, and by use of said hook rod lowers the assembly down through the manhole and tank compartment interior, until the locking cap 33 is entered into the open upper end of the valve member cage 13, and operatively positioned therein, by engagement of an external annular stop flange 55, with which said locking cap is provided, with the end of said cage. Return of the locking cap and valve member assembly into the cage 13 having been thus accomplished, the operator manipulates the hook rod so as to exert a lateral collapsing thrust against the actuating lever 47, whereby to downswing the same to normal plunger releasing position. As the actuating lever is thus downswung, it effects upswinging movement of the cam arm 48, whereby to disengage the latter from the plunger hub extension 34. As this occurs, the upswing of the cam arm 48 knocks against the trip lug or ear 53 of the retainer or detent pawl member 51, whereby to kick the same away from the locking cap 31, thus releasing the plunger 33 for upward movement under the thrust of the valve member spring 38. The released plunger 33 thereupon returns to its raised normal initial position in the locking cap cylinder 32. In thus rising, the bolt body receiving channel 45 of the plunger 33 is moved out of alignment with the locking bolt elements, and as thus moved carries the camming wall 46 past the ends of the bolt bodies 40, thereby exerting outward thrust upon the latter against the tension of their retracting springs 44. Such outward movement of the bolt bodies 40 projects the bolt nosings 43 outwardly of the locking cap 33 and into the bolt receiving channel 20 of the valve member cage 13, thus once more locking the locking cap and valve member assembly in operative secured relation to the emergency valve (see Figs. 1 and 4). After this the hook rod is disengaged and withdrawn, and the manhole closed, whereupon the tank compartment and emergency valve serving the same are conditioned for use.

It will be understood that some changes could be made in the above described constructions without departing from the scope of this invention as defined in the following claims. It is therefore intended that all matter contained in the foregoing description or shown in the accompanying drawings shall be interpreted as illustrative and not in a limiting sense.

We claim:

1. A valve mechanism for a tank outlet comprising a fixed external outlet portion having an upwardly open valve member cage extending therefrom into the tank interior and a port at the bottom of said cage, a valve member to close said port including an upwardly extending stem, a locking cap adapted to be entered within the upper open end of said cage, movable lock means carried by said cap and cooperative with said cage to releasably secure said cap to the latter, a plunger axially movable relative to said cap and slidably related to said valve member stem whereby to control said lock means, compression spring means between said plunger and valve member, and an actuating cam lever pivotally mounted on said stem, said cam lever being operable to depress said plunger to lock means releasing position whereby to free said cap and valve member for removal from said cage.

2. A valve mechanism for a tank outlet comprising a fixed external outlet portion having an upwardly open valve member cage extending therefrom into the tank interior and a port at the bottom of said cage, a valve member to close said port including an upwardly extending stem, a locking cap adapted to be entered within the upper open end of said cage, movable lock means carried by said cap and cooperative with said cage to releasably secure said cap to the latter, a plunger axially movable relative to said cap and slidably related to said valve member stem whereby to control said lock means, compression spring means between said plunger and valve member, an actuating cam lever pivotally mounted on said stem, said cam lever being operable to depress said plunger to lock means releasing position whereby to free said cap and valve member for removal from said cage, and a detent pawl also pivotally mounted on said stem and movable to engage said cap whereby to hold said plunger depressed to lock means releasing position.

3. A valve mechanism for a tank outlet comprising a fixed external outlet portion having an upwardly open valve member cage extending therefrom into the tank interior and a port at the bottom of said cage, a valve member to close said port including an upwardly extending stem, a locking cap adapted to be entered within the upper open end of said cage, movable lock means carried by said cap and cooperative with said cage to releasably secure said cap to the latter, a plunger axially movable relative to said cap and slidably related to said valve member stem whereby to control said lock means, compression spring means between said plunger and valve member, an actuating cam lever pivotally mounted on said stem, said cam lever being operable to depress said plunger to lock means releasing position whereby to free said cap and valve member for removal from said cage, a detent pawl also pivotally mounted on said stem in association with said cam lever and movable to engage said cap whereby to hold said plunger, as depressed by said cam lever, in lock means releasing position, and a trip lug on said detent pawl engageable by said cam lever when the latter is moved to plunger releasing position, whereby to release said detent pawl from cap engagement.

4. A valve mechanism for a tank outlet comprising a fixed external outlet portion having an upwardly open valve member cage extending therefrom into the tank interior and a port at the bottom of said cage, a valve member to close said port including an upwardly extending stem, a locking cap adapted to be entered within the upper open end of said cage, movable lock means carried by said cap and cooperative with said cage to releasably secure said cap to the latter, a plunger axially movable relative to said cap and slidably related to said valve member stem whereby to control said lock means, compression spring means between said plunger and valve member, said outlet portion of the valve mechanism having means subject to remote control for opening said valve member relative to said port, and a hook rod engageable cam lever pivotally mounted on said stem, said cam lever being operable by the hook rod to depress said plunger to lock means releasing position whereby to free said cap and valve member for withdrawal from said cage and upwardly out of the tank.

5. A valve mechanism for a tank outlet as defined in claim 4 including a detent pawl also pivotally mounted on said stem in association with said cam lever and movable to engage said cap whereby to hold said plunger, as depressed by said cam lever, in lock means releasing position, and a trip lug on said detent pawl engagebale by said cam lever when the latter is moved to plunger releasing position, whereby to release said detent pawl from cap engagement.

6. A valve mechanism for a tank outlet as defined in claim 1 wherein the lock means carried by the cap comprises spring retracted bolt elements, said cage having an internal annular receiving channel into which said bolt elements are projected by the plunger whereby to lock the cap to the cage, and said plunger having an external annular receiving channel into which said bolt elements are received when the plunger is depressed by said cam lever, whereby to withdraw said bolt elements from cap locking relation to said cage.

7. In a valve mechanism for a tank outlet as defined in claim 4 wherein the lock means carried by the cap comprises spring retracted bolt elements, said cage having an internal annular receiving channel into which said bolt elements are projected by the plunger whereby to lock the cap to the cage, and said plunger having an external annular receiving channel into which said bolt elements are received when the plunger is depressed by said cam lever, whereby to withdraw said bolt elements from cap locking relation to said cage.

HOWARD C. KRONE.
WILLIAM MEYER.

REFERENCES CITED

The following references are of record in the file of this patent:

UNITED STATES PATENTS

| Number | Name | Date |
| --- | --- | --- |
| 2,212,370 | Jensen | Aug. 20, 1940 |
| 2,237,377 | Thwaits | Apr. 8, 1941 |

FOREIGN PATENTS

| Number | Country | Date |
| --- | --- | --- |
| 522,176 | Great Britain | 1940 |